United States Patent
Challener et al.

(10) Patent No.: US 8,151,101 B2
(45) Date of Patent: Apr. 3, 2012

(54) METHOD, APPARATUS, AND SYSTEM FOR QUIESCING A BOOT ENVIRONMENT

(75) Inventors: David Carroll Challener, Raleigh, NC (US); Howard Locker, Cary, NC (US); Joseph Michael Pennist, Apex, NC (US); Randall Scott Springfield, Chapel Hill, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 717 days.

(21) Appl. No.: 12/265,909

(22) Filed: Nov. 6, 2008

(65) Prior Publication Data

US 2010/0115256 A1    May 6, 2010

(51) Int. Cl.
*G06F 9/00* (2006.01)
*G06F 9/24* (2006.01)
*G06F 9/44* (2006.01)

(52) U.S. Cl. .................. 713/2; 713/1; 717/168

(58) Field of Classification Search .............. 713/2, 1
See application file for complete search history.

(56) References Cited

U.S. PATENT DOCUMENTS

| 6,266,809 | B1 * | 7/2001 | Craig et al. | 717/173 |
|---|---|---|---|---|
| 6,330,634 | B1 * | 12/2001 | Fuse et al. | 711/103 |
| 6,907,602 | B2 * | 6/2005 | Tsai et al. | 717/168 |
| 7,457,945 | B2 * | 11/2008 | Dailey et al. | 713/2 |
| 7,480,905 | B2 * | 1/2009 | Nagao | 717/171 |
| 2005/0246701 | A1 * | 11/2005 | Kanapathipillai et al. | 717/168 |
| 2006/0184717 | A1 * | 8/2006 | Rothman et al. | 711/103 |
| 2009/0241103 | A1 * | 9/2009 | Pennisi et al. | 717/173 |

* cited by examiner

*Primary Examiner* — Suresh Suryawanshi
(74) *Attorney, Agent, or Firm* — Kunzler Needham Massey & Thorpe

(57) ABSTRACT

An apparatus, system, and method are disclosed for quiescing a boot environment. A reservation module reserves a portion of a first storage device. A store module stores an update boot image to the reserved portion. A detection module detects the update boot image stored on the first storage device when the computer boots and executes the update boot image in place of a standard boot image in response to detecting the update boot image. The update boot image places a computer in a known quiescent state.

19 Claims, 6 Drawing Sheets

METHOD, APPARATUS, AND SYSTEM FOR QUIESCING A BOOT ENVIRONMENT

BACKGROUND OF THE INVENTION

1. Field of the Invention

This invention relates to boot environments and more particularly relates to quiescing a boot environment.

2. Description of the Related Art

Computers typically include a least one processor and memory. However, computers also include components, such as a hard disk controller, a network adapter, and the like. Each component may include a component processor and a component memory. The component memory may store one or more computer readable programs such as firmware. The component processor may execute the firmware.

It may be desirable to update the firmware in a component memory after a computer has been shipped to a customer. Unfortunately, components typically include a single component memory. As a result, the component may not be used while updating the component memory. This makes it difficult to update component memories as one of the many other computer readable programs executing on a computer processor may inadvertently access component while the component memory is being updated.

SUMMARY OF THE INVENTION

From the foregoing discussion, there is a need for an apparatus, system, and method that quiesces a boot environment. Beneficially, such an apparatus, system, and method would support updating component firmware in a quiescent environment.

The present invention has been developed in response to the present state of the art, and in particular, in response to the problems and needs in the art that have not yet been fully solved by currently available quiescing methods. Accordingly, the present invention has been developed to provide a method, apparatus, and system for quiescing a boot environment that overcomes many or all of the above-discussed shortcomings in the art.

A method of the present invention is presented for quiescing a boot environment. In one embodiment, the method includes reserving a portion of a first storage device, storing an update boot image, detecting the update boot image, and executing the update boot image.

A reservation module reserves a portion of a first storage device. A store module stores an update boot image to the reserved portion. A detection module detects the update boot image stored on the first storage device when the computer boots and executes the update boot image in place of a standard boot image in response to detecting the update boot image. The update boot image places a computer in a known quiescent state.

The apparatus for quiescing a boot environment is provided with a plurality of modules configured to functionally execute the steps of the method. The modules include the reservation module, the store module, and the detection module.

The reservation module reserves a portion of a first storage device. The store module stores an update boot image to the reserved portion. The detection module detects the update boot image stored on the first storage device when the computer boots and executes the update boot image in place of a standard boot image in response to detecting the update boot image. The update boot image places a computer in a known quiescent state.

A system of the present invention is also presented to quiesce a boot environment. The system may be embodied in a computer. In particular, the system, in one embodiment, includes a disk cache, a memory, and a processor. The memory may store and the processor may execute a computer readable program. The computer readable program includes a reservation module, a store module, and a detection module.

The reservation module reserves a portion of the disk cache. The store module stores an update boot image to the reserved portion. The detection module detects the update boot image stored on the disk cache when the computer boots and executes the update boot image in place of a standard boot image in response to detecting the update boot image. The update boot image places the system in a known quiescent state.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention quiesces a boot environment. The boot environment may be quiesced so that firmware may be reliably updated. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
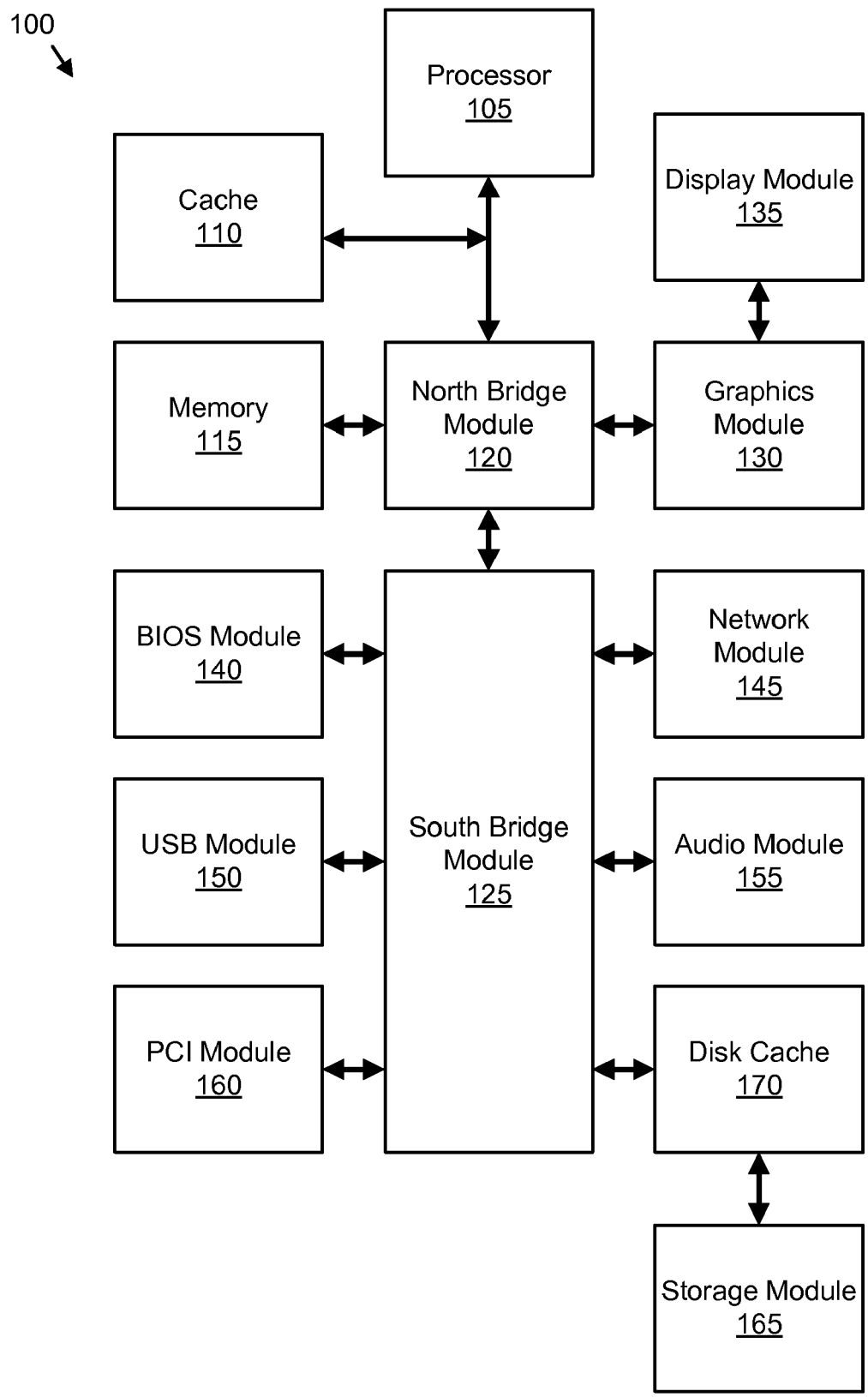
FIG. 1 is a schematic block diagram illustrating one embodiment of a computer in accordance with the present invention.

FIG. 1 is a schematic block diagram illustrating one embodiment of a computer 100 in accordance with the present invention. The computer 100 includes a processor 105, a cache module 110, a memory 115, a north bridge module 120, a south bridge module 125, a graphics module 130, a display module 135, a basic input/output system (BIOS) module 140, a network module 145, a peripheral component interconnect (PCI) module 160, a storage module 165, and a disk cache 170.

The processor 105, cache module 110, memory 115, north bridge module 120, south bridge module 125, graphics module 130, display module 135, BIOS module 140, network module 145, PCI module 160, storage module 165, and disk cache 170, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 115 stores computer readable programs. The processor 105 executes the computer readable programs as is well known to those skilled in the art. The computer readable programs may be tangibly stored in the storage module 165. The storage module 165 may be a hard disk drive, an optical storage device, a holographic storage device, a micromechanical storage device, a semiconductor storage device, or the like.

The disk cache 170 may store data from the storage module 165. For example, the disk cache 170 may prefetch data from a hard disk drive storage module 165 that may be requested by the memory 115. In addition, the disk cache 170 may buffer data that is to be written to the hard disk drive storage module 165. In one embodiment, the disk cache is disposed on a common circuit board with the processor 105. The common circuit board may be a motherboard for the computer 100.

The processor 105 may communicate with the cache module 110 through a processor interface bus to reduce the average time to access memory 115. The cache module 110 may store copies of the data from the most frequently used memory 115 locations. The computer 100 may use one or more cache modules 110 such as a DDR2 cache memory or the like.

The north bridge module 120 may communicate with and provide bridging functionality between the processor 105, the graphic module 130, the memory 115, and the cache module 110. The processor 105 may be connected to the north bridge module 120 over a, for example, six hundred sixty seven Megahertz (667 MHz) front side bus.

The north bridge module 120 may be connected to the south bridge module 125 through a direct media interface (DMI) bus. The DMI bus may provide a high-speed, bi-directional, point-to-point link supporting a clock rate for example of one Gigabytes per second (1 GBps) in each direction between the north bridge module 120 and the south bridge module 125. The south bridge module 125 may support and communicate with the BIOS module 140, the network module 145, the PCI module 160, and the storage module 165.

The PCI module 160 may communicate with the south bridge module 125 for transferring data or power to peripheral devices. The PCI module 160 may include a PCI bus for attaching the peripheral devices. The PCI bus can logically connect several peripheral devices over the same set of connections. The peripherals may be selected from a printer, a joystick, a scanner, or the like. The PCI module 160 may also be an expansion card as is well known to those skilled in the art.

The BIOS module 140 may communicate instructions through the south bridge module 125 to boot the computer 100, so that software instructions stored on the storage module 165 can load, execute, and assume control of the computer 100. Alternatively, the BIOS module 140 may comprise a coded program embedded on a chipset that recognizes and controls various devices that make up the computer 100. The BIOS module 140 may typically execute a standard boot image.

The network module 145 may communicate with the south bridge module 125 to allow the computer 100 to communicate with other devices over a network. The devices may include routers, bridges, computers, printers, and the like.

The display module 135 may communicate with the graphic module 130 to display the topological display of the user interface elements. The display module 135 may be a cathode ray tube (CRT), a liquid crystal display (LCD) monitor, or the like. The USB module 150 may communicate with one or more USB compatible devices over a USB bus. The audio module 155 may generate an audio output.

Figure 2:
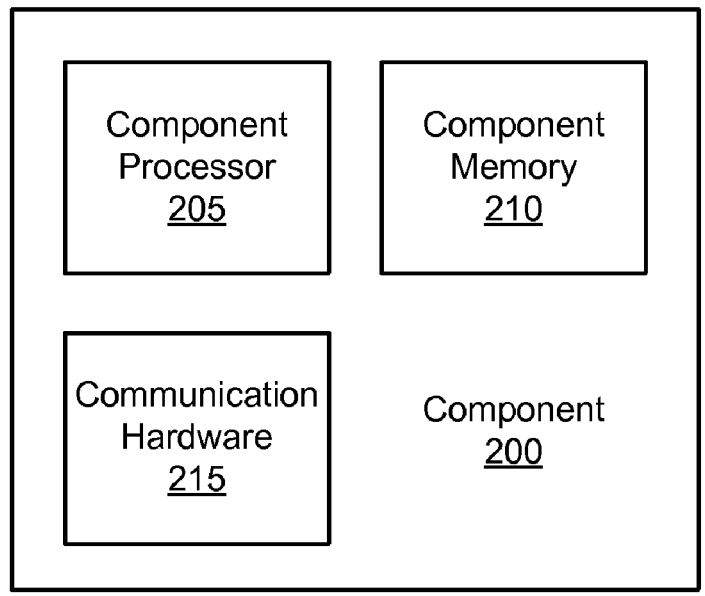
FIG. 2 is a schematic block diagram illustrating one embodiment of a component of the present invention.

FIG. 2 is a schematic block diagram illustrating one embodiment of a component 200 of the present invention. The component 200 is representative of a computer component of FIG. 1, such as the graphics module 130, the storage module 165, the audio module 155, and the like. The description of the component 200 refers to elements of FIG. 1, like numbers referring to like elements. The component 200 includes a component processor 205, a component memory 210, and communication hardware 215.

The component processor 205 is separate and distinct from the processor 105. In addition, the component memory 210 is separate and distinct from the memory 115. For example, the component 200 may be configured as a storage module 165, where the storage module 165 is a hard disk drive. The component memory 210 may store a computer readable program such as firmware that when executed by the component processor 205 controls the storage module 165. The communication hardware 215 may communicate with other components within the computer 100 and/or one or more computer buses.

It may be desirable to update the firmware stored in the component memory 210. Unfortunately, this may be unreliable if other components within the computer 100 are accessing the component 200. The present invention boots the computer 100 to a known quiescent state so that a computer readable program may be reliably loaded to the component memory 210 as will be described hereafter.

Figure 3:
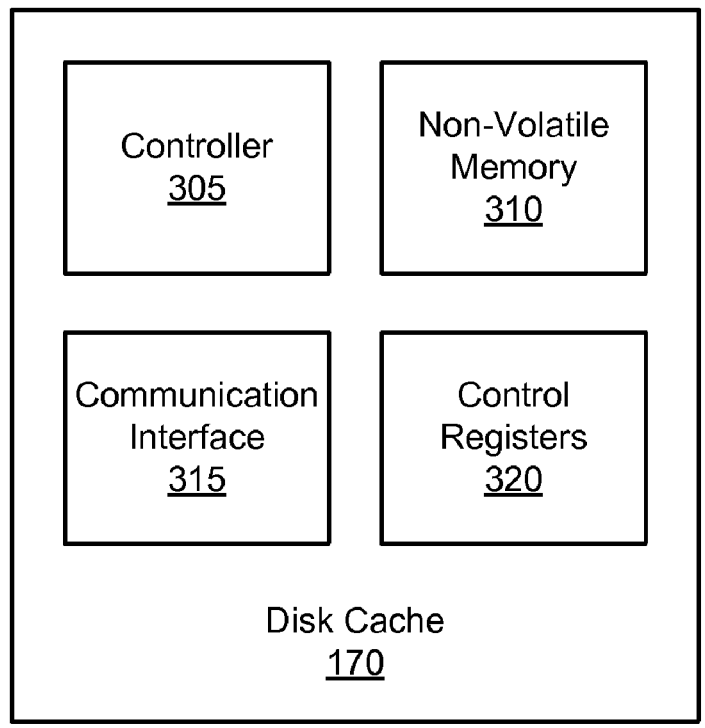
FIG. 3 is a schematic block diagram illustrating one embodiment of a disk cache of the present invention.

FIG. 3 is a schematic block diagram illustrating one embodiment of a disk cache 170 of the present invention. The disk cache 170 is the disk cache 170 of FIG. 1. The description of the disk cache 170 refers to elements of FIGS. 1-2, like numbers referring to like elements. The disk cache 170 includes a controller 305, a non-volatile memory 310, a communication interface 315, and control registers 320.

The controller 305 may manage the disk cache 170. In one embodiment, the controller 305 executes a computer readable program that is stored on the non-volatile memory 310. Alternatively, the controller 305 may execute a computer readable program that is stored on the controller 305.

The communication interface 315 may communicate with the storage module 165. In addition, the communication interface 315 may communicate with one or more components and/or computer buses of the computer 100. For example, the communication interface 315 may communicate with the DMI bus.

The non-volatile memory 310 may store data that is read from the storage module 165 and/or store data that is to be written to the storage module 165. The non-volatile memory 310 may be divided into a plurality of portions as will be described hereafter. The control registers 320 may specify one or more states for the portions. For example, the control registers 320 may specify that a second portion of the non-volatile memory 310 is available for caching data from the storage module 165.

In one embodiment, the present invention employs the disk cache 170 to store an update boot image. The update boot image may be used to quiesce the computer 100 and update the firmware of the component memory 210 as will be described hereafter.

Figure 4:
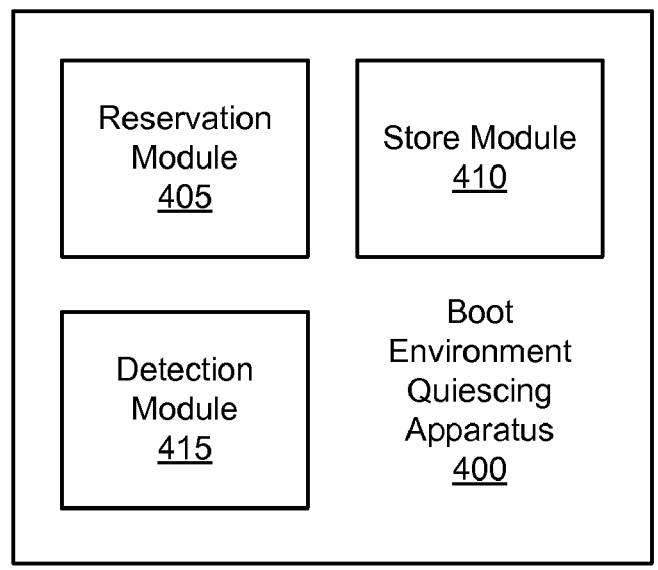
FIG. 4 is a schematic block diagram illustrating one embodiment of a boot environment quiescing apparatus of the present invention.

FIG. 4 is a schematic block diagram illustrating one embodiment of a boot environment quiescing apparatus 400 of the present invention. The apparatus 400 may be embodied in the computer 100 of FIG. 1. The description of the apparatus 400 refers to elements of FIGS. 1-3, like numbers referring to like elements. The apparatus 400 includes a reservation module 405, a store module 410, and a detection module 415.

The reservation module 405, storage module 410, and detection module 415 may each be a computer readable storage medium comprising a computer readable program stored on a tangible storage device such as the memory 115 and/or the storage module 165. The computer readable program may be executed by the processor 105.

The reservation module 405 reserves a portion of a first storage device. The first storage device may be the non-volatile memory 310 of the disk cache 170. In one embodiment, the first storage device is separate and distinct from the BIOS module 140 and any memory of the BIOS module 140. In a certain embodiment, the reservation module 405 reserves the portion of the first storage device by writing a value to the control registers 320 of the disk cache 170. For example, the control registers 320 may include a reservation control register for each portion of the non-volatile memory 310 that designates the portion as reserved.

Alternatively, the reservation module 405 may reserve the portion of the first storage device by writing a specified code to a specified address of the portion. For example, the reservation module 405 may write to hexadecimal code AAAAxh to a first word of the portion. The hexadecimal code may indicate that the portion is reserved.

The store module 410 stores an update boot image to the reserved portion of the first storage device. In one embodiment, the store module 410 receives the update boot image. For example, the store module 410 may receive the update boot image from the network module 145, the network module 145 receiving the update boot image from a network such as the Internet. The store module 410 may further temporarily store the update boot image in a buffer such as the memory 115.

The detection module 415 detects the update boot image stored on the first storage device when the computer boots. In addition, the detection module 415 may validate the update boot image. The detection module 415 may further execute the update boot image in place of the standard boot image in response to detecting the update boot image. The update boot image places the computer 100 in a known quiescent state as will be described hereafter. Alternatively, the detection module 415 may place the computer 100 in the known quiescent state. In addition, the update boot image may copy and updated computer readable program to the component memory 210 to update a component 200.

The detection module 415 may further mark the update boot image as executed. In addition, the detection module 415 may reboot the computer 100. Alternatively, the update boot image may reboot the computer. The computer 100 may then boot with the standard boot image.

The apparatus 400 quiesces the computer 100. In addition, the apparatus 400 may update firmware for the component 200 while a computer 100 is the known quiescent state. Thus the apparatus 400 supports a reliable update of component firmware.

Figure 5:
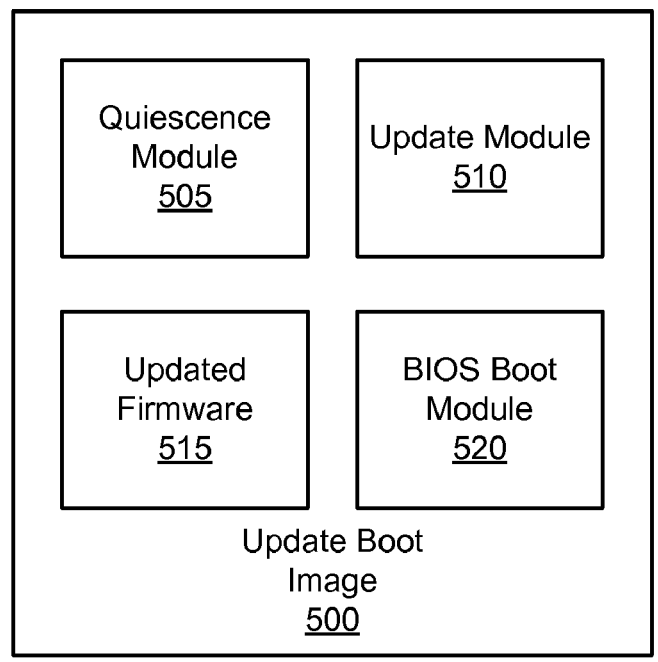
FIG. 5 is a schematic block diagram illustrating one embodiment of an update boot image of the present invention.

FIG. 5 is a schematic block diagram illustrating one embodiment of an update boot image 500 of the present invention. The update boot image 500 may be stored on a portion of the first storage device. For example, the update boot image 500 may be stored on the non-volatile memory 310 of the disk cache 170. The description of the update boot image 500 refers to elements of FIGS. 1-4, like numbers referring to like elements. The update boot image 500 includes a quiescence module 505, an update module 510, updated firmware 515, and the bios boot module 520. The quiescence module 505, update module 510, updated firmware 515, and BIOS boot module 520 may each comprise a computer readable storage medium such as computer readable program that is stored in a tangible storage device such as the non-volatile memory 310 and executed by a processor such as the processor 105.

The quiescence module 505 when executed by the processor 105 may boot the computer 100 into a known quiescent state. In one embodiment, the known quiescent state does not execute programs that access components 200 such as the storage module 165, the network module 145, the graphics module 130, the USB module 150, the PCI module 160, and the like. Thus in the known quiescent state, components that may be a target of the update boot image 500 are not being accessed. As a result, firmware for the component 200 may be safely updated.

The updated firmware 515 may be a firmware update for the component 200. The update module 510 may copy the updated firmware 515 from the update boot image 500 to the component memory 210. The BIOS boot module 520 may reboot the computer 100 after the update module 510 has successfully copied the updated firmware 515 to the component memory 210. Thus the update boot image 500 comprises a computer readable program with the functionality to boot the computer 100 to the known quiescent state, update firmware for the component 200, and reboot the computer 100 wherein the computer 100 reboots using the standard boot image.

Figure 6:
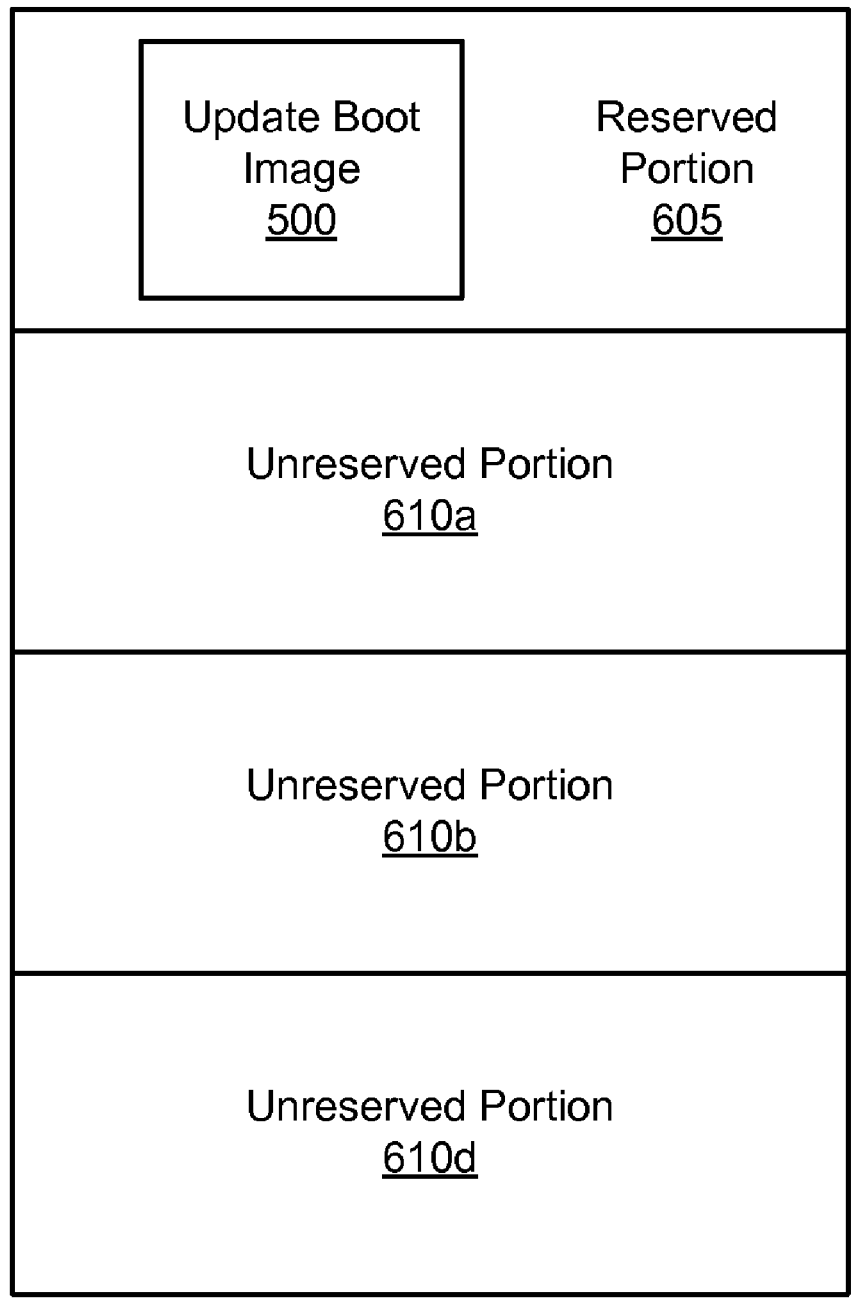
FIG. 6 is a schematic block diagram illustrating one embodiment of a disk cache non-volatile memory of the present invention.

FIG. 6 is a schematic block diagram illustrating one embodiment of non-volatile memory 310 of the present invention. The non-volatile memory 310 may be embodied in the disk cache 170 of FIGS. 1 and 2. Alternatively, the non-volatile memory 310 may be embodied in the BIOS module 140, the south bridge module 125, a storage device in communication with the USB module 150, and/or a storage device in communication with the PCI module 160. The description of the non-volatile memory 310 refers to elements of FIGS. 1-5, like numbers referring to like elements. The non-volatile memory 310 includes at least one reserved portion 605 and at least one unreserved portions 610.

The non-volatile memory 310 is depicted divided into four portions 605, 610. However, any number of portions 605, 610 may be employed. The reserved portion 605 stores the update boot image 500. The unreserved portions 610 may be used to perform other functions such as caching data for the storage module 165.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
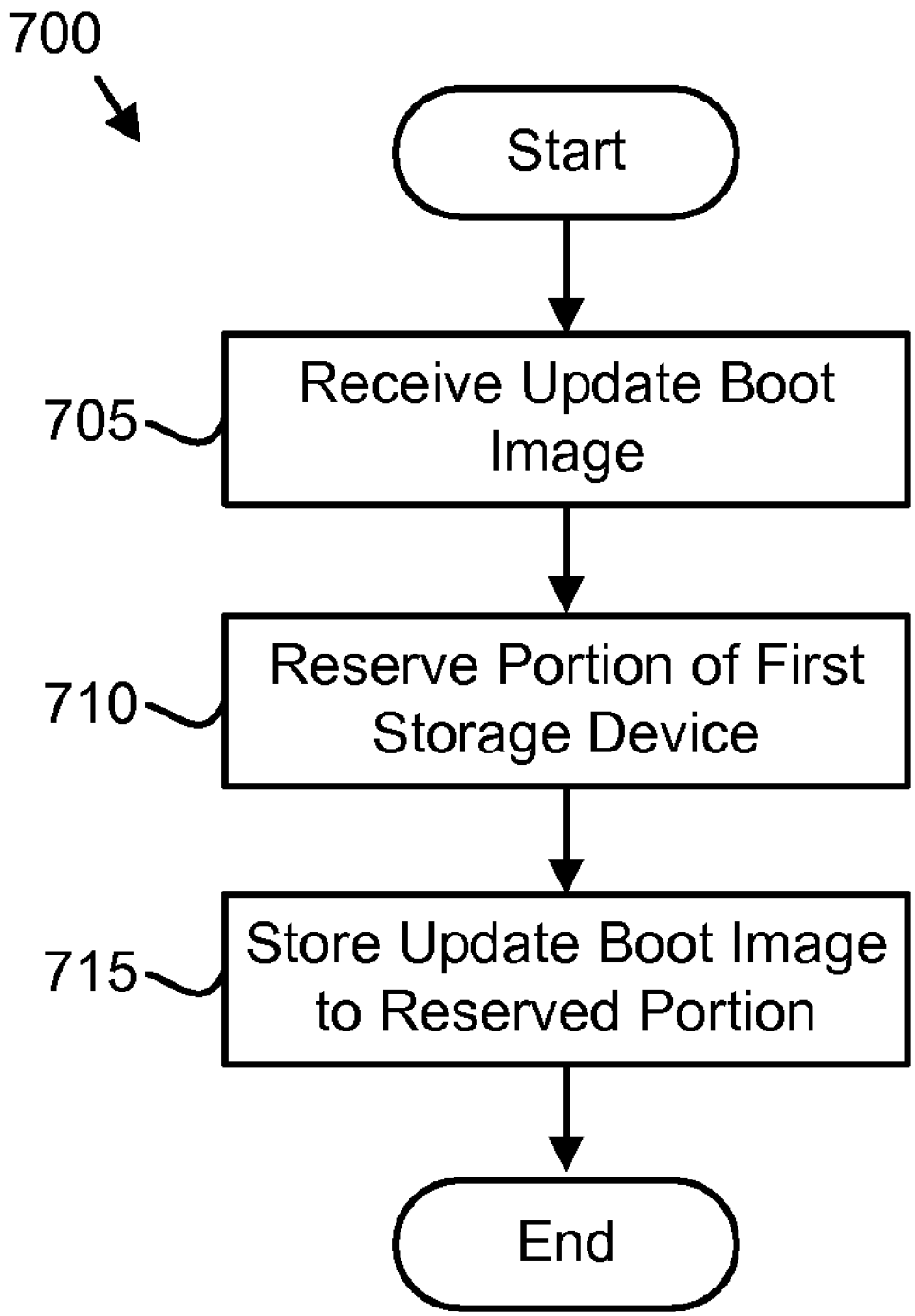
FIG. 7 is a schematic flow chart diagram illustrating one embodiment of an update boot image storage method of the present invention.

FIG. 7 is a schematic flow chart diagram illustrating one embodiment of an update boot image storage method 700 of the present invention. The method 700 substantially includes the steps to carry out the functions presented above with respect to the operation of the described apparatus and system of FIGS. 1-6. In one embodiment, the method 700 is implemented with a computer readable storage medium comprising a computer readable program stored on a tangible storage device. The computer readable storage medium may be integrated into a computing system, such as the computer 100, wherein the computer readable program executed by the computing system performs the method 700.

The method 700 begins, and in one embodiment the store module 410 receives 705 the update boot image 500. The store module 410 may receive 705 the update boot image 500 over a network through the network module 145, from a peripheral storage device such as a USB drive in communication with the USB module 150, from an optical storage drive in communication with the south bridge module 125 through the storage module 165, or the like.

The reservation module 405 reserves 710 a portion 605 of the first storage device, such as the non-volatile memory 310 of the disk cache 170. In one embodiment, the reservation module 405 issues a command to the controller 305 of the disk cache 170. In response to the command, the controller 305 may write a bit such as a binary one (1) to a reservation control register of the control registers 320. The bit may indicate that the portion 605 is a reserved portion 605.

The store module 410 stores 715 the update boot image 500 to the reserved portion 605 at the method 700 ends. In one embodiment, the control registers 320 includes an update boot image control register. The store module 410 may set the update boot image control register after storing 715 the update boot image to the reserved portion 605.

In one embodiment, the store module 410 provides the controller 305 with an access code that allows the store module 410 to write to the reserved portion 605. The method 700 stores 715 the update boot image 500 to the reserved portion 605 prior to booting the computer 100. Thus the update boot image 500 is available to execute as will be described hereafter.

Figure 8:
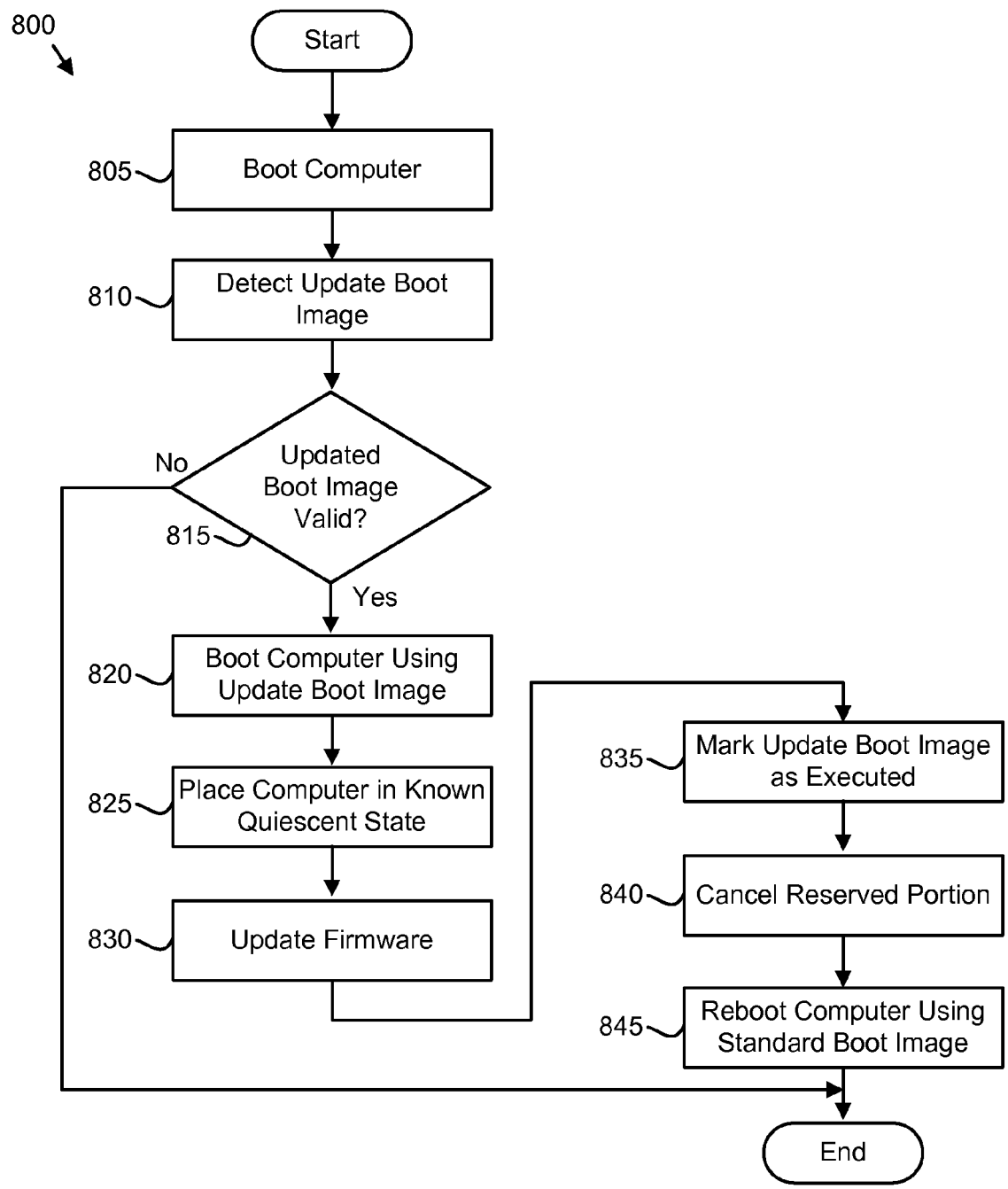
FIG. 8 is a schematic flow chart diagram illustrating one embodiment of a boot quiescing method of the present invention.

FIG. 8 is a schematic flow chart diagram illustrating one embodiment of a boot quiescing method 800 of the present invention. The method 800 substantially includes the steps to carry out the functions presented above with respect to the operation of the described apparatus and system of FIGS. 1-6. In one embodiment, the method 800 is implemented with a computer readable storage medium comprising a computer readable program stored on a tangible storage device. The computer readable storage medium may be integrated into a computing system, such as the computer 100, wherein the computer readable program executed by the computing system performs the method 800.

The method 800 starts, and in one embodiment the computer 100 boots 805. The computer 110 may boot 805 as part of normal operations. In one embodiment, a user may boot the computer 100 by turning on the computer 100. In a certain embodiment, a system administrator boots 805 the computer 100 remotely as part of a maintenance operation. In an alternate embodiment, the computer 100 may boot 805 in response to storing the update boot image 500. For example, the store module 410 may boot 805 the computer 100 after storing 715 the update boot image 500 to the reserved portion 605.

The detection module 415 detects 810 the update boot image 500 stored on the first storage device. In one embodiment, the detection module 415 detects 810 the update boot image by reading the control registers 320. If a reservation control register for the reserved portion 605 is set, the detection module 415 may detect 810 the update boot image 500.

In a certain embodiment, the detection module 415 detects 810 the update boot image 500 by reading the specified code from the specified address of the reserved portion 605. For example, reading a hexadecimal code AAAAxh from the first word of the reserved portion 605 may indicate to the detection module 415 that the update boot image 500 is stored on the first storage device. Alternatively, the detection module 415 may detect 810 the update boot image 500 if the reservation control register is set and if the specified code is read from the specified address.

In one embodiment, the detection module 415 detects 810 the update boot image 500 by reading the update boot image control register. If the update boot image register is set, the detection module 415 detects 810 the update boot image 500.

The detection module 415 may determine 815 if the update boot image 500 is valid. In one embodiment, the detection module 415 detects a valid boot sector in the update boot image 500 to determine that the update boot image 500 is valid. If the update boot image 500 does not include a valid boot sector, the detection module 415 may determine 815 that the update boot image 500 is invalid.

In an alternate embodiment, the update boot image 500 includes a digital certificate. The updated firmware 515 may include the digital certificate. The quiescence module 505, update module 510, and BIOS boot module 520 may also include the digital certificate. The detection module 415 may determine 815 that the update boot image 500 is valid if the digital certificate is valid. In one embodiment, the detection module 415 may decode the digital certificate using a public key of a public key/private key pair to validate the digital certificate.

The detection module 415 further executes the update boot image 500 in place of the standard boot image in response to detecting the update boot image. The update boot image 500 places the computer 100 in a known quiescent state as will be described hereafter. In addition, the update module 510 update boot image 500 may copy the updated firmware 515 to the component memory 210 to update the component 200.

In one embodiment, the detection module 415 validates a hash of the update boot image 500 to validate the update boot image 500. For example, the detection module 415 may hash the update boot image 500 and compare the hash to a known value. In one embodiment, the detection module 415 passes the hash and/or digital certificate to the BIOS module 140. The BIOS module 140 may notify the detection module 415 if the hash and/or digital signature is valid.

In addition, the detection module 415 may boot 820 the computer 100. In one embodiment, the detection module 415 performs a soft boot of the computer 100. The detection module 415 may write a value to a system register of the computer 100 to initiate a soft boot of the computer 100.

The detection module 415 places 825 the computer 100 in a known quiescent state. In one embodiment, the detection module 415 may execute the quiescence module 505 to place 825 a computer 100 in the known quiescent state. In a certain embodiment, the quiescence module 505 does not contain programs that access one or more specified components. For example, the quiescence module 505 may lack programs that access the storage module 165. In addition, the quiescence module 505 may include instructions to quiesce a target component 200 such as the storage module 165. For example, the quiescence module instructions may park a hard disk drive of the storage module 165 and put the hard disk drive in a standby mode. Thus while the computer 100 is in the known quiescent state, the storage module 165 will not be accessed.

In one embodiment, all computer components are quiesced in the known quiescent state. Alternatively, selected computer components may be quiesced in the known quiescent state.

In one embodiment, the detection module 415 updates 830 the firmware one or more components 200. In one embodiment, the detection module 515 copies the firmware update 515 to the component memory 210 at the component 200. In one embodiment, the detection module 415 initiates the execution of the update module 510 in the update boot image 500 to update the firmware. The update module 510 may copy the updated firmware 515 to one or more component memories 210. For example, the update module 510 may include specific instructions for updating a component 200 such as the storage module 165.

The detection module 415 may further mark 835 the update boot image 500 as executed. In one embodiment, the detection module 415 marks 835 the update boot image 500 as executed by overwriting the digital certificate of the update boot image 500. In an alternate embodiment, the detection module 415 marks 835 the update boot image 500 as executed by overwriting the update boot image 500. The detection module 415 may also mark 835 the update boot image 500 as executed by writing a specified mark value to a specified mark address of the update boot image 500.

In one embodiment, the detection module 415 cancels 840 the reserved portion 605 so that the reserved portion 605 is no longer reserved. The detection module 415 may cancel 840 the reserved portion 605 by issuing the command to the controller 305 of the disk cache 170. In response to the command, the controller 305 may clear bits in the control registers 320. For example, the controller 305 may clear a reservation control register of the control registers 320 to cancel 840 the reservation of the reserved portion 605.

In one embodiment, the detection module 415 may overwrite the specified code in the specified address of the reserved portions 605 to cancel 840 the reserved portion 605. For example, the detection module 415 may overwrite the first word of the reserved portions 605 to cancel 840 the reserved portion 605.

The detection module 415 further reboots 845 the computer 100 using the standard boot image of the BIOS module 140. In one embodiment, the detection module 415 executes the BIOS boot module 520 to reboot the computer 100 after the update module 510 has successfully copy to the updated firmware 515 to the component memory 210. The computer 100 may then boot with the standard boot image.

The present invention boots 820 a computer 100 using an update boot image 500 that places the computer 100 in a known quiescent state. In the known quiescent state, the present invention may further upload updated firmware 515 to one or more components 200 of the computer 100. As a result, component firmware may be safely and predictably updated and/or upgraded.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium comprising a computer readable program stored on a tangible storage device for quiescing a boot environment, wherein the computer readable program when executed on a computer causes the computer to:

reserve a portion of a first storage device;
store an update boot image to the reserved portion;
detect the update boot image stored on the first storage device when the computer boots; and
execute the update boot image in place of a standard boot image in response to detecting the update boot image, wherein the update boot image places the computer in a known quiescent state that does not access a first component; and
update firmware for the first component, the first component comprising a component processor and a component memory separate and distinct from a processor and a memory of the computer.

2. The computer readable storage medium of claim 1, wherein the first storage device is separate and distinct from a Binary Input Output System (BIOS) memory.

3. The computer readable storage medium of claim 1, wherein the first storage device is a disk cache for a hard disk drive.

4. The computer readable storage medium of claim 3, wherein the disk cache is disposed on a motherboard of the computer.

5. The computer readable storage medium of claim 1, wherein the computer readable program is further configured to cause the computer to:
receive the update boot image;
validate the update boot image;
mark the update boot image as executed; and
reboot the computer, wherein the marked update boot image is not detected and the computer boots with the standard boot image.

6. The computer readable storage medium of claim 5, wherein the computer readable program is further configured to cause the computer to validate the update boot image by validating a digital certificate for the updated boot image.

7. The computer program of claim 6, where digital certificate is passed to a BIOS module for validation.

8. The computer readable storage medium of claim 5, wherein the computer readable program is further configured to cause the computer to validate the update boot image by validating a boot sector.

9. The computer readable storage medium of claim 5, wherein the computer readable program is further configured to cause the computer to cancel the reserved portion, wherein the portion is not reserved.

10. The computer readable storage medium of claim 1, wherein the computer readable program is further configured to cause the computer to reserve the portion by writing a specified code to a specified address of the portion.

11. The computer readable storage medium of claim 1, wherein the computer readable program is further configured to cause the computer to reserve the portion by setting a reservation control register of the first storage device.

12. An apparatus comprising:
a second storage device storing a computer readable program executed by a second processor, the computer readable program comprising:
a reservation module reserving a portion of a first storage device;
a store module storing an update boot image to the reserved portion;
a detection module detecting the update boot image stored on the first storage device when a computer boots, executing the update boot image in place of a standard boot image in response to detecting the update boot image, wherein the update boot image places the computer in a known quiescent state that does not access a first component, and updating firmware for the first component, the first component comprising a component processor and a component memory separate and distinct from the second processor and the second storage device.

13. The apparatus of claim 12, the store module further receiving the update boot image, and the detection module further validating the update boot image, marking the update boot image as executed, and rebooting the computer, wherein the marked update boot image is not detected and the computer boots with the standard boot image.

14. The apparatus of claim 13, wherein the detection module validates the update boot image by validating a digital certificate for the updated boot image.

15. The apparatus of claim 13, the detection module further canceling the reserved portion, wherein the portion is not reserved.

16. A system comprising:
a disk cache;
a memory storing a computer readable program;
a processor executing the computer readable program, the computer readable program comprising
a reservation module reserving a portion of the disk cache;
a store module storing an update boot image to the reserved portion;
a detection module detecting the update boot image stored on the disk cache when the processor boots and executing the update boot image in place of a standard boot image in response to detecting the update boot image, wherein the update boot image places the system in a known quiescent state that does not access a first component and updates firmware for the first component, the first component comprising a component processor and a component memory separate and distinct from the processor and the memory.

17. The system of claim 16, wherein the disk cache and processor are disposed on a common circuit board.

18. The system of claim 16, wherein the reservation module reserves the portion by setting a reservation control register of the disk cache.

19. The system of claim 16, wherein the disk cache is separate and distinct from the memory.

* * * * *